US009921607B2

(12) United States Patent
Sherlock

(10) Patent No.: US 9,921,607 B2
(45) Date of Patent: Mar. 20, 2018

(54) PORTABLE USER INPUT SYSTEM OPERABLE IN TWO MODES

(71) Applicant: Solatido Inc., Palo Alto, CA (US)

(72) Inventor: Thomas M. Sherlock, Los Altos, CA (US)

(73) Assignee: SOLATIDO INC, Palo Alto, CA (US)

(*) Notice: Subject to any disclaimer, the term of this patent is extended or adjusted under 35 U.S.C. 154(b) by 30 days.

(21) Appl. No.: 14/104,642

(22) Filed: Dec. 12, 2013

(65) Prior Publication Data

US 2014/0191941 A1 Jul. 10, 2014

Related U.S. Application Data

(60) Provisional application No. 61/750,227, filed on Jan. 8, 2013.

(51) Int. Cl.
G06F 1/16 (2006.01)
G06F 3/02 (2006.01)
G02B 27/01 (2006.01)

(52) U.S. Cl.
CPC ........... G06F 1/163 (2013.01); G02B 27/017 (2013.01); G06F 1/1664 (2013.01); G06F 1/1666 (2013.01); G06F 3/0221 (2013.01); G02B 2027/014 (2013.01); G02B 2027/0178 (2013.01)

(58) Field of Classification Search
CPC ................ G06F 3/0221; G06F 3/021
See application file for complete search history.

(56) References Cited

U.S. PATENT DOCUMENTS

| 5,067,834 A * | 11/1991 | Szmanda et al. ............ 400/489 |
| 5,122,786 A * | 6/1992 | Rader ............................ 345/168 |
| 5,267,127 A * | 11/1993 | Pollitt ........................ B41J 5/105 341/20 |
| 5,278,779 A * | 1/1994 | Conway ................. G06F 1/1616 361/679.16 |
| 5,410,333 A * | 4/1995 | Conway ........................ 345/169 |
| 5,424,728 A * | 6/1995 | Goldstein ................ B41J 5/105 341/20 |
| 5,454,652 A * | 10/1995 | Huellemeier ............ B41J 5/105 341/20 |
| 5,574,481 A * | 11/1996 | Lee ............................. B41J 5/10 341/22 |
| 5,612,691 A * | 3/1997 | Murmann ............. G06F 3/0216 341/22 |
| 5,708,449 A * | 1/1998 | Heacock et al. .................. 345/8 |
| 5,841,635 A * | 11/1998 | Sadler ..................... H01H 13/84 200/5 A |
| 5,933,320 A * | 8/1999 | Malhi ................... G06F 1/1616 200/341 |

(Continued)

Primary Examiner — Nicholas Lee
Assistant Examiner — Robert Stone
(74) Attorney, Agent, or Firm — Christopher Peil; Law Office of Christopher Peil

(57) ABSTRACT

A portable user interface device receives user inputs in two modes. The user interface device includes a central portion attached to two side portions. Relative rotation between the central portion and the side portions converts the user interface device between the two modes. In the first mode, the user interface device is suspended on the front of a user's torso. In the second mode, the user interface device may be placed on a substantially flat horizontal surface.

14 Claims, 5 Drawing Sheets

(56) References Cited

U.S. PATENT DOCUMENTS

| | | | | |
|---|---|---|---|---|
| 6,005,497 A * | 12/1999 | Snyder | G06F 3/0221 | 200/506 |
| 6,031,469 A * | 2/2000 | Dodd | G06F 3/0219 | 341/20 |
| 6,055,153 A * | 4/2000 | Chiu | G06F 1/1616 | 361/679.09 |
| 6,174,097 B1 * | 1/2001 | Daniel | G06F 3/0221 | 400/472 |
| 6,215,419 B1 * | 4/2001 | Leman | | 341/22 |
| D448,032 S * | 9/2001 | Talley | | D14/320 |
| 6,297,752 B1 * | 10/2001 | Ni | | 341/22 |
| 6,384,810 B1 * | 5/2002 | Selker | | 345/168 |
| 6,460,221 B1 * | 10/2002 | Eromaki | G06F 1/1616 | 16/277 |
| 6,630,924 B1 * | 10/2003 | Peck | G06F 1/163 | 345/156 |
| 8,539,705 B2 * | 9/2013 | Bullister | G06F 1/1615 | 345/1.1 |
| 2002/0001498 A1 * | 1/2002 | Li | G06F 3/0221 | 400/472 |
| 2002/0021935 A1 * | 2/2002 | Li | G06F 3/0221 | 403/119 |
| 2002/0175957 A1 * | 11/2002 | Huang | G06F 3/0221 | 715/863 |
| 2003/0030623 A1 * | 2/2003 | Yu | G06F 3/0202 | 345/168 |
| 2003/0048596 A1 * | 3/2003 | Hsieh | G06F 3/0221 | 361/679.16 |
| 2003/0112589 A1 * | 6/2003 | Shimano | G06F 1/162 | 361/679.09 |
| 2003/0201982 A1 * | 10/2003 | Iesaka | G06F 1/1616 | 345/168 |
| 2003/0206394 A1 * | 11/2003 | Ossia | G06F 1/162 | 361/679.27 |
| 2004/0119685 A1 * | 6/2004 | Harries | G06F 1/1616 | 345/156 |
| 2004/0203513 A1 * | 10/2004 | Kwon | G06F 1/1616 | 455/90.3 |
| 2004/0228668 A1 * | 11/2004 | Hsu | | 400/472 |
| 2004/0239631 A1 * | 12/2004 | Gresham | G06F 3/0216 | 345/168 |
| 2005/0146446 A1 * | 7/2005 | Hsu | G06F 1/1632 | 341/22 |
| 2006/0038775 A1 * | 2/2006 | Agata | G06F 1/1626 | 345/156 |
| 2006/0099023 A1 * | 5/2006 | Katz | G06F 3/0221 | 400/472 |
| 2006/0176660 A1 * | 8/2006 | Amiri | G06F 1/1615 | 361/679.09 |
| 2006/0214916 A1 * | 9/2006 | Mulford | G06F 1/1616 | 345/169 |
| 2007/0080954 A1 * | 4/2007 | Griffin et al. | | 345/173 |
| 2007/0281747 A1 * | 12/2007 | Pletikosa | H04M 1/0225 | 455/564 |
| 2009/0135030 A1 * | 5/2009 | Ron | H03M 11/24 | 341/26 |
| 2010/0085308 A1 * | 4/2010 | Jarczyk | G06F 1/1616 | 345/168 |
| 2012/0111173 A1 * | 5/2012 | Bowen | G10H 1/34 | 84/170 |
| 2012/0293935 A1 * | 11/2012 | Sherlock | | 361/679.03 |

* cited by examiner

PORTABLE USER INPUT SYSTEM OPERABLE IN TWO MODES

CROSS-REFERENCE TO RELATED APPLICATION

This application claims priority under 35 U.S.C. § 119(e) to U.S. Provisional Patent Application Ser. No. 61/750,227 filed on Jan. 8, 2013 and entitled "Double Mode Portable User Input System with Thumb Operated Center Piece," which is incorporated by reference herein in its entirety.

BACKGROUND OF THE INVENTION

1. Field of the Invention

This disclosure relates generally to computer input devices, and more particularly to computer input devices having multiple configurations and input modes.

2. Description of the Related Art

An ideal computer input device enables efficient, portable human-computer interaction without user discomfort. In an effort to increase portability, recent designs have sought to reduce size and weight at the expense of less efficient interaction.

Many handheld and mobile devices impose significant size and weight requirements. These requirements have led to miniature keyboards and touch screens. Miniature keyboards provide tactile feedback, but they are uncomfortable to use because a user may be limited to typing with only two digits (often thumbs). Additionally, miniature keyboards face durability issues because their smaller components fail more quickly. Touch screen devices offer a larger area for user input because the entire display area may be used for input. However, touch screens offer no tactile feedback, so they decrease input speed and accuracy. Additionally, touch screens increase cost and fragility over a typical display screen. Both touch screens and miniature keyboards are ill-suited for inputs that require use of special characters and number because they are generally configured with fewer keys than a standard QWERTY computer keyboard. Finally, touch screens and miniature keyboards generally rely on the operator monitoring a display to ensure accurate input, so they hinder operator mobility.

Other efforts have focused on making standard QWERTY keyboards more portable. Some of these efforts include projection keyboards and rollable keyboards. Projection keyboards project light onto a flat surface and detect when a user's digit has moved into an area of space between a projected key and the keyboard projector. Rollable keyboards are made out of flexible materials so that the keyboard can be rolled up for easier transportation. Although these keyboards are easily moved from one location to another, they rely on a flat surface for support and are insufficient for mobile use.

Some wearable input devices include input functionality. However, these wearable devices provide limited functionality. For example, a watch features one or more buttons for setting a time and modifying an alarm. However, these buttons are ill-suited to more generalized tasks requiring input of words, numbers, or more specialized data. Another approach has outfitted a wearable glove with electronics to track the motion of each digit of the hand. However, this technology requires the user to learn a specialized gesture vocabulary to accomplish tasks. This gesture vocabulary requires significant training to develop muscle memory for efficient use. The library of recognizable gestures may be too limited to signal all the inputs necessary to accomplish a given task, particularly tasks requiring alphanumeric input.

SUMMARY

Embodiments relate to a user interface device operable in two modes. The user interface device includes a central portion connected to two side portions. The side portions have input devices (e.g., keys) and may be rotated relative to the central portion to convert the device between the two modes, a first mode and a second mode. In the first mode, the user interface device receives input while suspended on a user's torso. The user interface device includes a suspension system attachment to secure the user interface device to a suspension system or device (e.g., a neck strap). In the second mode, the side portions are unfolded from the central portion, so the user interface device may be placed on a substantially flat horizontal surface for operation.

In one embodiment, the central portion has one or more input devices that may be operated with the thumbs.

In one embodiment, the user interface device may be part of a wearable computing system. The wearable computing system may include a memory for storing instructions, a processor for executing instructions, a display, and an audio output. The memory includes instructions mapping signals from the input devices to inputs to the processor, display, or audio output. The mapping instructions may be reprogrammable or may change based on context.

In one embodiment, the display is mounted on the head for mobile use.

In one embodiment, the user interface device includes a housing for a detachable processing device, such as a smart phone. The processing device may provide one or more functions of the wearable computing system. The wearable computing system may also include input and output interfaces, a mode detector, and a communication module.

BRIEF DESCRIPTION OF THE DRAWINGS

The teachings of the embodiments can be readily understood by considering the following detailed description in conjunction with the accompanying drawings.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of the disclosure.

Figure 1A:
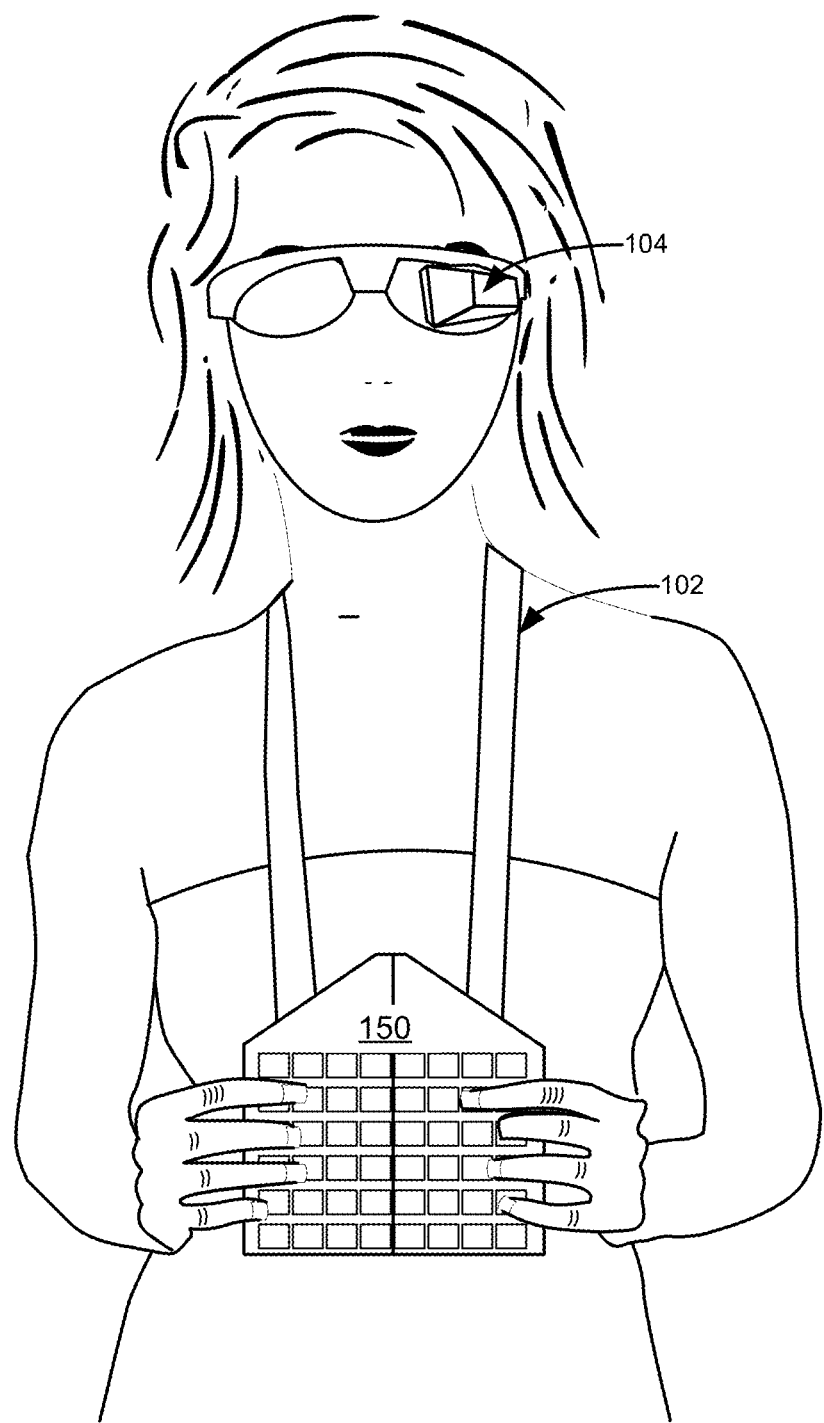
FIG. 1A is a conceptual diagram illustrating an example use of an interface device in a first mode, according to an embodiment.

FIG. 1A illustrates an example use of an input device 150 in a first mode, according to an embodiment. A device user of FIG. 1A wears a wearable computing system including the interface device 150, a neck strap 102, and a display 104. The interface device 150 is coupled to the display 104. A user may input data to a computing system using the user interface device 150.

The user interface device 150 is held or suspended in front of the user's torso using a neck strap 102 in the displayed embodiment. In an alternate embodiment, the interface device 150 is coupled to a suspension system secured to the body (e.g., a chest strap, a hip-mounted system), a clothing item (e.g., a shirt, a vest, a coat), or another item secured to the body (e.g., a backpack). The suspension system may include a clip, a buckle, a hook and loop fastener, or an elastic tension band, for example.

In the first mode, the interface device 150 is folded into a compact configuration. The user may access input devices on the front and back of the interface device 150 while engaging in one of many activities such as sitting, standing, walking, or lying down.

The display 104 graphically displays information from the wearable computer system, including inputs received from the interface device 150. The display 104 is connected to the interface device 150 using a wired or wireless connection over a local-area or wide-area network. In one embodiment, the display 104 is mounted on the head and includes a transparent view for overlaying content (e.g., a heads-up display). Alternately or additionally, the display 104 covers both eyes for stereoscopic functionality (e.g., visualization of three-dimensional models, immersive or augmented reality applications). Alternate displays 104 include screens, projectors, and other displays that may be developed (e.g., holographic displays, tactile displays).

Figure 1B:
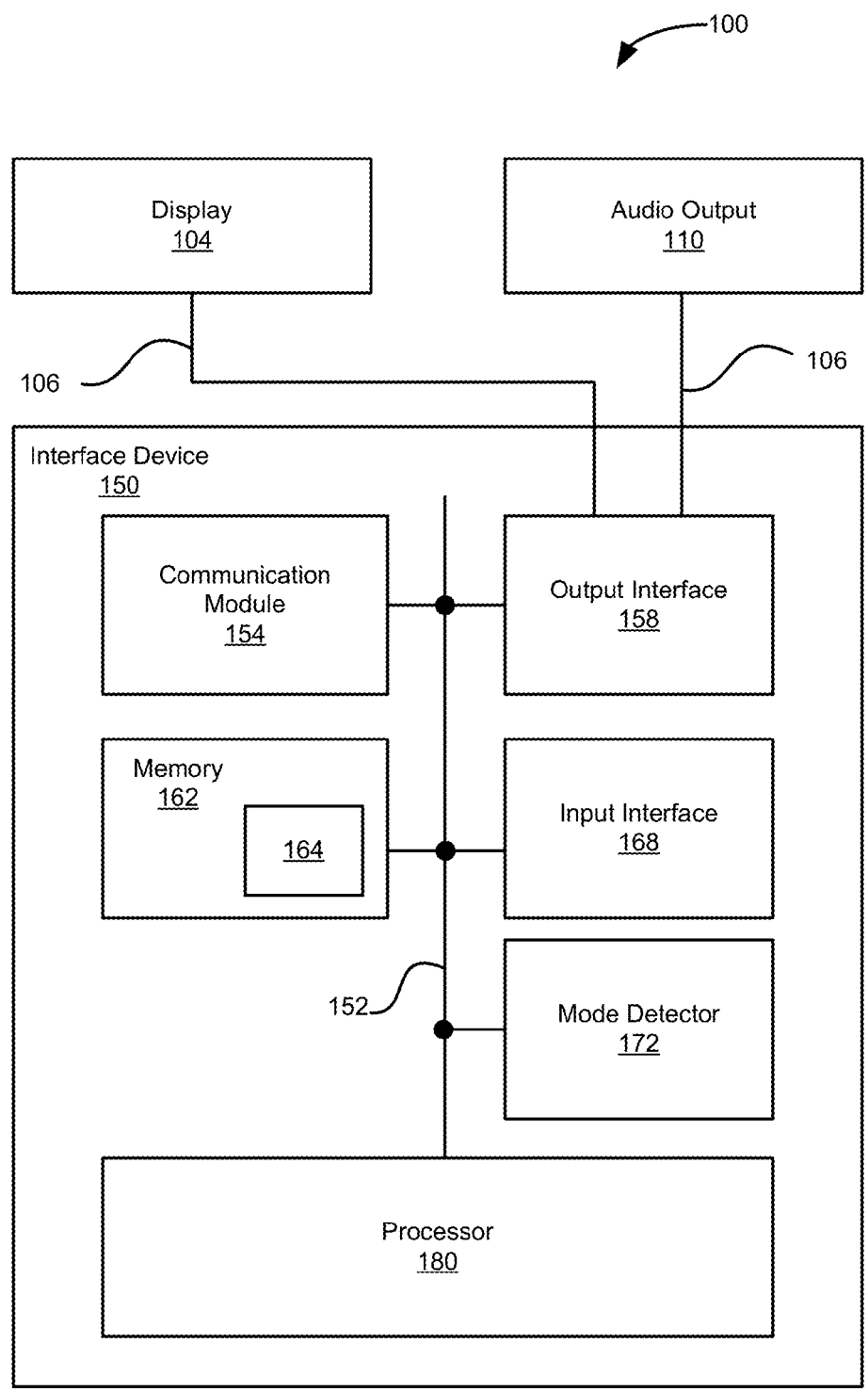
FIG. 1B is a block diagram illustrating example components of a wearable computing system including the user interface device, according to an embodiment.

FIG. 1B is a block diagram illustrating example components of a wearable computing system including the interface device, according to an embodiment. The wearable computing system 100 may include, among other components, the interface device 150, the head-mounted display 104, channels 106, and an audio output 110. The wearable computing system 100 is a portable computing device that enables a user to perform a full range of computing operations in diverse stances including sitting, standing, lying down, or walking The audio output device 110 is coupled to the interface device 150 and may relay audio information to a user. Example audio output devices 110 include speakers (e.g., mounted to the interface device 150, standalone speakers) or headphones.

The interface device 150 may include, among other components, a bus 152, a communication module 154, an output interface 158, a memory 162 containing instructions 164, an input interface 168, a mode detector 172, and a processor 180. A channel 106 is a wired or wireless connection over a local-area or wide-area network. Example channels 106 include a USB (Universal Serial Bus) cable, an HDMI (high-definition multimedia interface) cable, a MHL (Mobile High-Definition Link) cable, a Bluetooth connection, or a WiFi connection. The bus 152 couples the components of the interface device 150 using similar means to the channel 106.

The communication module 154 enables communication with other devices including computers, smartphones, other interface devices, or a different input device. The communication module 154 may connect through an additional channel 106 (not shown). The communication module 154 may include software for handling communication protocols and/or hardware (e.g., an antenna, a port or interface for a wired connection).

The output interface 158 enables the interface device 150 to output visual signals to the display 104 and audio signals to the audio output 110 using the channels 106. The output interface 158 may include software for handling communications protocol and/or hardware (e.g., an antenna, a port or interface for a wired connection). The output interface 158 may include specialized processors for graphics or audio (e.g., a graphics processing unit (GPU)) and hardware connections for communication.

The memory 162 stores instructions 164 for execution by the processor 180. The memory 162 includes any computer-readable media capable of storing instructions 164. In one embodiment, the instructions 164 include mapping information for the input interface. Example embodiments of memory 162 include semiconductor memory devices, (e.g., electrically erasable programmable memory (EEPROM), random access memory (RAM), and flash memory devices; magnetic disks such as internal hard disks and removable discs; and optical discs such as CD-ROM or DVD discs.

The input interface 168 enables communication with a human user through input devices on the user interface device 150. In one embodiment, the input devices are keys assigned in a particular layout (e.g., QWERTY, Dvorak, regional variations adapted to different languages or dialects, personally defined keyboard layouts). In one embodiment, the input devices are reprogrammable, and a user may toggle the input devices among numerous configurations using an input device. In one embodiment, the input device configuration changes depending on whether the user interface device 150 is configured in the first or second mode. In an alternate embodiment, the input device configuration changes automatically depending on a detected use such as data entry or generation of particular audio signals (e.g., musical notes or tones). The input interface 168 may also receive signals from various other sensors or devices (e.g., breath sensor of a musical instrument, and sensor for chemical analysis of soil samples). These other sensors or devices may also be portable or wearable and extend functionality of the wearable computing system The mode detector 172 determines whether the user interface device is configured in the first mode, the second mode, or neither. In one embodiment, the mode detector is coupled to one or more sensors or switches that detect relative rotation between the portions of the user interface device 150.

The processor 180 is hardware capable of executing computer instructions. Example processors include a microprocessor, a central processing unit (CPU), a GPU, a digital signal processor (DSP), a field-programmable gate array (FPGA), a programmable logic device (PLD), and an application-specific integrated circuit (ASIC). In one embodiment, the functionality of the processor 180 (or other components) is provided by a detachable processing device. For example, detachable computing devices include a smart phone, a mobile phone, a personal digital assistant (PDA), a laptop, a smart watch, smart glasses, and other computing devices that may be developed. A processing device may be attached to a portion of the user interface device 150, as described below in detail with reference to FIG. 2.

Figure 2:
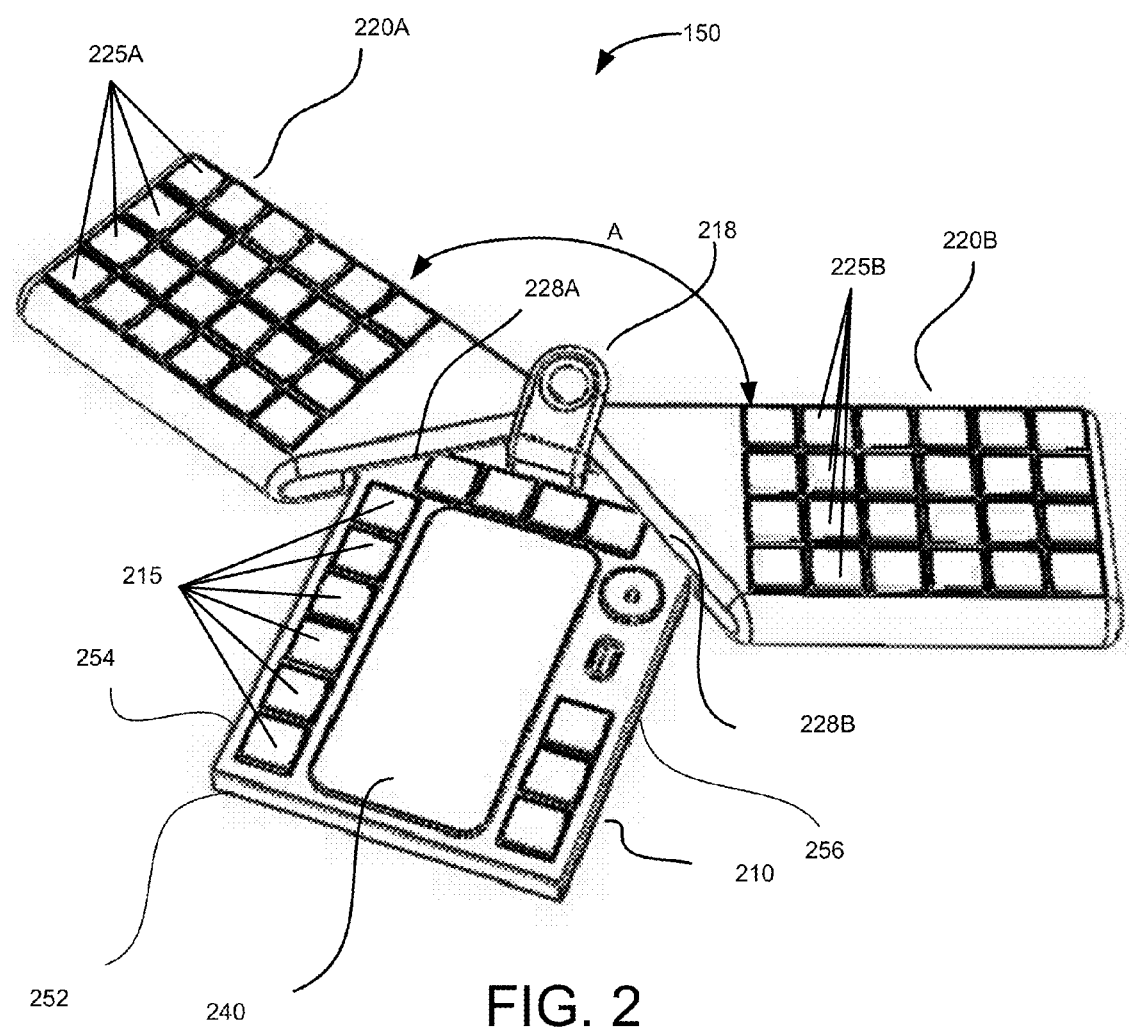
FIG. 2 is a top perspective diagram illustrating an interface device in a second mode, according to an embodiment.

FIG. 2 is a top perspective diagram illustrating an interface device 150 in a second mode, according to an embodiment. The user interface device 150 includes a central portion 210 and two side portions 220A, 220B (hereinafter collectively referred to as "the side portions 220"). The central portion 210 includes center input devices 215, a suspension system attachment 218, and a processing device housing 240. The side portions 220 include side input devices 225A, 225B (hereinafter collectively referred to as "the side input devices 225"). The side portions 220A and 220B are connected to the central portion 210 by the hinges 228A and 228B, respectively.

In one embodiment, the central portion 210 has a frame shaped like an irregular pentagon. Two side edges 254, 256 are substantially perpendicular to a bottom edge 252. Two top edges are adjacent to each other and are connected to the side edges 254, 256. The central portion includes fifteen center input devices 215 (thirteen keys, a pointing stick, and a thumb wheel). The frames of the side portions 220 are shaped like an irregular trapezoid having two substantially parallel edges. The side portions 220 include forty-eight side input devices 225 (forty-eight keys distributed evenly between the side portions 220).

The side portions 220 house the side input devices 225, and the central portion houses the center input devices 215. Example input devices 215, 225 include input devices engaged by mechanical contact (e.g., a key, a button, a directional pad, a joystick, a pointing stick, a control stick, a lever) and capacitive or conductance sensing input devices (e.g., a touch screen, a touch pad, a track pad). Other example input devices include a mouth controller, an optical detector, or input devices engaged with a rotational motion (e.g., a scroll wheel, a thumb wheel, a trackball). Input devices 215, 225 may be used to communicate linguistic symbols (e.g., a letter, a number, a punctuation mark, a linguistic character, a whitespace character) or sensory information (e.g., a musical note, a color, a sound). Input devices 215, 225 may also alter the function of other input devices (e.g., a case shift key) or relay a command (e.g., a macro, a display control, a command to a program executing on the processor 180). The input interface 168 detects inputs from the input devices 215, 225.

In the second mode, the central portion 210 and side portions 220 are configured to lie on a substantially flat horizontal surface. Typical surfaces include a hard, flat surface like a desk, a counter, or a table. The hinges 228 enable relative rotation between the central portion 210 and the side portions 220. Because of this relative rotation, the user interface device 150 may be used in the second mode on an uneven surface (e.g., the user's lap, a rock, a tree stump) or a soft surface (e.g., a couch, a bed, a grassy field). In the second mode, Angle A between the edges of the side portions 210A and 210B is approximately 140 degrees. Alternate embodiments may have an Angle A between 120 degrees and 160 degrees.

In one example key configuration, the side input devices 225 form a QWERTY keyboard, and the center input devices 215 are used for keys such as "Shift," "Tab," "Control," "Alternate," "Space," "Backspace," and punctuation marks. In the second mode, a user operates the center input devices 215 with thumbs and the side input devices 225 with the non-thumb fingers.

A hinge 228 allows relative rotation between the central portion 210 and a side portion 220 about an axis parallel to a top edge of the central portion 210. Alternately or additionally to the hinges 228, other connecting devices that allow relative rotation may used (e.g., a pin, a swivel, a ball-and-socket joint). In one embodiment, the hinges 228 snap or lock when the device is configured in the first or second mode so that the portions 210, 220 resist relative rotation. In one embodiment, the mode detector 172 monitors rotation around the hinges 228. The mode detector 172 may be embodied, for example, as a switch that is depressed or released when the user interface device 150 is converted between the first and second modes.

The processing device housing 240 physically accommodates a processing device. The processing device housing 240 physically attaches the processing device to the central portion 210. In one embodiment, the processing device housing 240 includes channels 106 for communication with the processing device. In one example use, the user verifies inputs on a display 104 included in an attached processing device. The attached processing device may indicate functional assignment of the input devices 215, 225. In one embodiment, the processing device is a smart phone with a touch screen, which is coupled to the output interface 158 and the input interface 168. In one embodiment, the processing device is coupled to the communication module 154 or provides the functionality thereof. Example means for attaching the processing device include a latch, a hook, a strap, an enclosure, and magnets.

The suspension system attachment 218 secures the user interface device 150 to the suspension system (e.g., the neck strap 102). The functional form of the suspension system attachment depends on the suspension system. The suspension system attachment 218 protrudes from the central portion 210, and a neck strap or other strap penetrates a void in the suspension system attachment 218. In an alternate embodiment, the suspension system attachment 218 is integrated into the central portion 210 (e.g., a void in the central portion 210). In yet another alternate embodiment, a suspension system attachment 218 enables separation of the user interface device 150 from the suspension system (e.g., a clasp, a clip, a buckle, hook-and-loop fasteners, a zipper, a button). The suspension system attachment 218 may also be secured to a side portion 220, or the user interface device 150 may include additional suspension system attachments 218.

Figure 3:
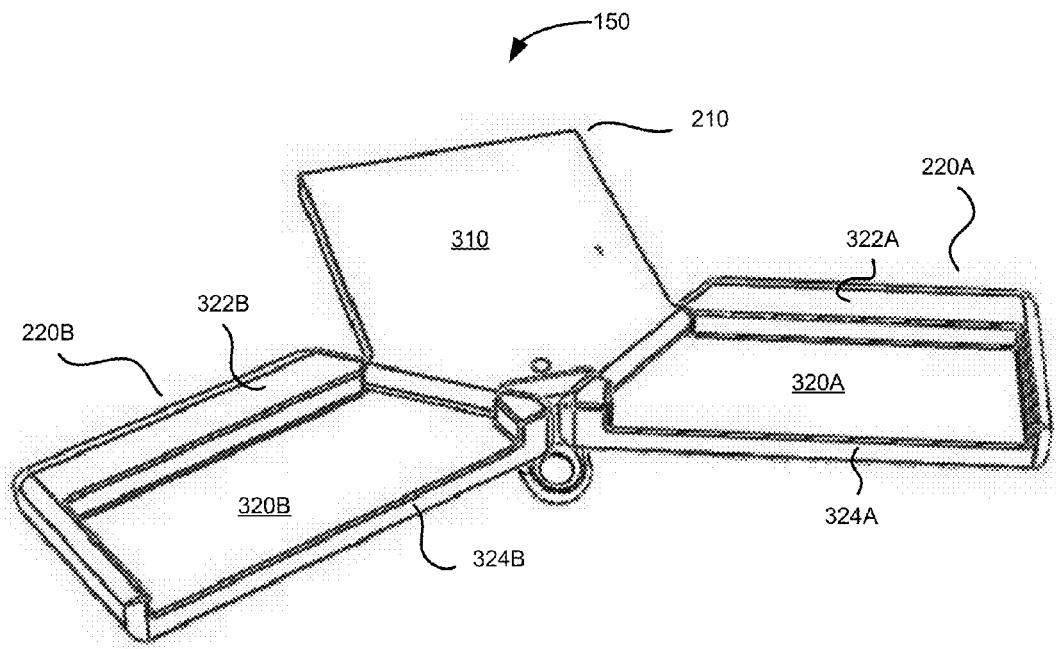
FIG. 3 is a bottom perspective diagram illustrating the interface device in the second mode, according to an embodiment.

FIG. 3 is a bottom perspective diagram illustrating the interface device 150 in the second mode, according to an embodiment. The central portion 210 has a central rear surface 310. The side portions 220 have side rear surfaces 320 and skirts 322A, 322B (hereinafter collectively referred to as "the skirts 322"). In the second mode, the rear surfaces 310, 320 face a substantially flat, horizontal surface supporting the user interface device 150. The skirts 322 are attached to the frame at the edges of the rear surfaces 320.

In one embodiment, the back edges 324A, 324B of the side portions 220 do not have a skirt 322 attached to enable folding the user interface device 150 into the first mode. The skirts 322 extend substantially perpendicular to the plane of the rear surfaces 310 and the plane containing the side input devices 225. In one embodiment, the skirts 322 are dimensioned to enclose (at least partially) the central portion 210 when the user interface device 150 is configured in the first mode.

Figure 4:
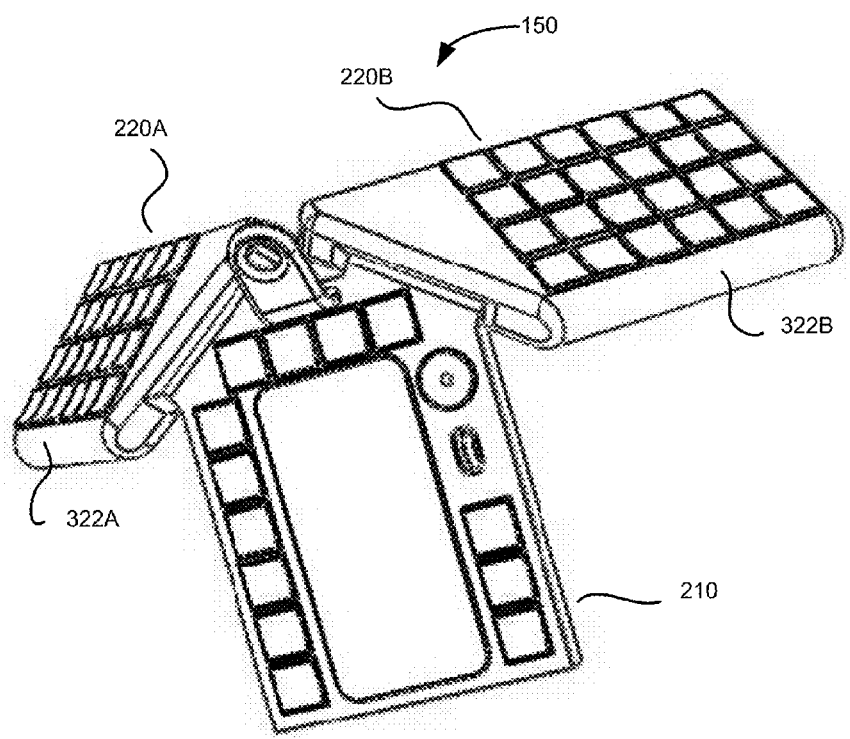
FIG. 4 is a perspective diagram illustrating the interface device in the midst of conversion between the first and second modes, according to an embodiment.

FIG. 4 is a perspective diagram illustrating the interface device 150 in the midst of conversion from the second mode to the first mode, according to an embodiment. To convert to the first mode, the side portions 220 are rotated relative to the central portion 210 until the center input devices 215 face opposite from the side input devices 225. In one embodiment, the hinges snap or lock into place when the user interface device 150 is configured in the first mode or the second mode. As shown in FIG. 4, one or more of the skirts 322 may include a rounded edge.

Figure 5:
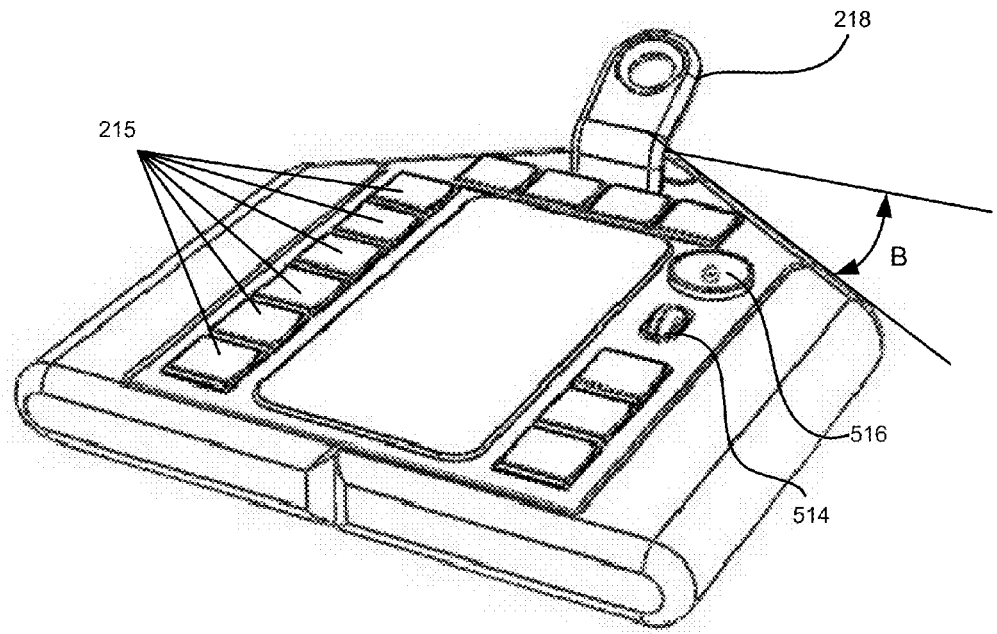
FIG. 5 is a perspective diagram illustrating a central portion of the interface device in the first mode, according to an embodiment.

FIG. 5 is a perspective diagram illustrating the central portion 210 of the user interface device 150 in the first mode, according to an embodiment. In the first mode, the central rear surface 310 faces the side central surfaces 320 and is enclosed by the skirts 322. The central portion 210 includes a thumb wheel 514 and a pointing stick 516, which are example center input devices 215.

In one embodiment, Angle B between a top edge of the central portion 210 and a line parallel to the bottom edge of the central portion 210 is approximately 35 degrees. Alternate embodiments may have an Angle B between 30 degrees and 40 degrees. Angle B determines Angle A when the side portions 210 are rotated into the second mode.

Figure 6:
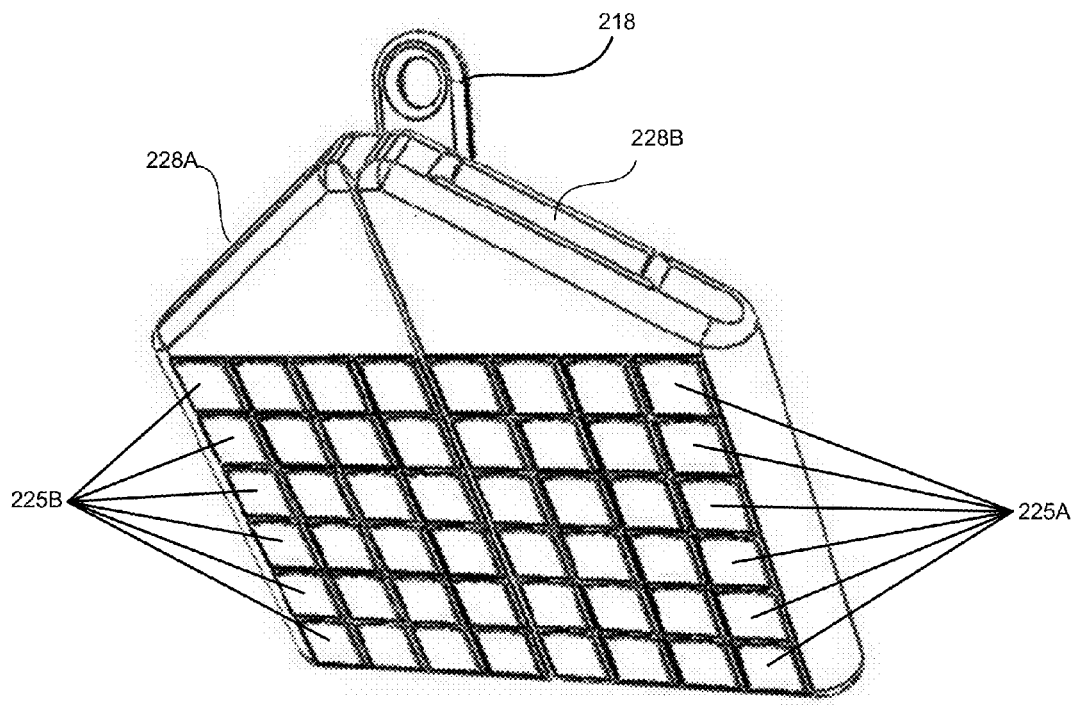
FIG. 6 is a perspective diagram illustrating side portions of the interface device in the first mode, according to an embodiment.

FIG. 6 is a perspective diagram illustrating the side portions 210 of the interface device in the first mode, according to an embodiment. In the first mode, a user operates the side input devices 225 with the index finger, middle finger, ring finger, and little finger; the user operates the center input devices 215 with thumbs.

While particular embodiments and applications of the present invention have been illustrated and described, it is to be understood that the disclosure is not limited to the precise construction and components disclosed herein. Various modifications, changes and variations may be made in the arrangement, operation and details of the method and apparatus of the present disclosure without departing from the spirit and scope of the disclosure as described herein.

What is claimed is:

1. A user interface device comprising:
a first portion comprising a housing for detachably mounting a mobile computing device within the user interface device;
a second portion comprising a first set of input devices, the second portion hinged to the first portion for relative rotation between a first mode and a second mode; and
a third portion comprising a second set of input devices, the third portion hinged to the first portion for relative rotation between the first mode and the second mode,
in the first mode: the first portion is suspended on a front of a user's torso with the first and second sets of input devices facing away from the user's torso, and in the second mode: the first and second sets of input devices are arranged to face away and upward from a substantially flat, horizontal surface, making all keys and controls on. all three. portions usable and accessible from the top of the assembly responsive to the first portion being placed on the substantially flat horizontal surface;
wherein each of the second and third portions further comprises:
a frame having at least four edges, two edges of the at least four edges being substantially parallel, the frame configured to secure the first or second set of input devices on the second OT third portion; and
a plurality of skirts, each skirt attached to the frame at one of the at least four edges and extending substantially perpendicular to a plane containing the first or second set of input devices on the second or third portion, wherein said skirts provide support to the second and third portion such that when in the second mode, an upper surface of the second and third portions rests at a level position above an upper surface of the first portion.

2. The user interface device of claim 1, wherein the first portion comprises a third set of input devices selected from a group consisting of: keys, touch pads, scroll wheels, thumb wheels, joysticks, mouth controllers, and track balls, levers, directional pads, and touch screens.

3. The user interface device of claim 1, further comprising a mobile computing device detachably mounted within the device housing.

4. The user interface device of claim 1, further comprising:
a suspension system connected to at least one of the first, second and third portions and configured to suspend the user interface device on the user's torso.

5. The user interface device of claim 4, wherein the suspension system is selected from a group consisting of: a neck strap, a torso strap, a shoulder strap, and hook and loop fasteners.

6. The user interface device of claim 1,
wherein the plurality of skirts is dimensioned to enclose the first portion in tie first mode.

7. The user interface device of claim 1, wherein each of the second and third portions has a substantially flat edge along which the first set of input devices or the second set of input devices is arranged, the flat edges of the second. and. third portions forming an angle with each other between 120 and 160 degrees in the second mode.

8. The user interface device of claim 1, wherein the first set of input devices or the second set of input devices is selected from a group consisting of: keys, touch pads, scroll wheels, thumb wheels, joysticks, mouth controllers, track balls, levers, directional pads, and touch screens.

9. The user interface device of claim 1, wherein the user interface device communicates with a display device that indicates functional assignment of the first and second sets of input devices.

10. The user interface device of claim 1, wherein the user interface device communicates with. a head-mounted display.

11. The user interface device of claim 1, wherein functions of the first and second sets of input devices are reprogrammable.

12. The user interface device of claim 1, wherein the second portion is hinged to a first edge of the first portion and a third portion is hinged to a second edge of the first potion, the second edge adjacent to the first edge.

13. The user interface device of claim 1, wherein the first and second sets of input devices form a QWERTY keyboard.

14. A computing device comprising: a user interface device comprising:
a first portion comprising a housing for a mobile computing device detachably mounted within the user interface device;
a second portion comprising a first set of input devices, the second portion hinged to the first portion for relative rotation between a first mode and a second mode; and
a third portion comprising a second set of input devices, the third portion hinged to the first portion for relative rotation between the first mode and the second mode,
in the first mode: the first portion is suspended on a front of a user's torso with the first and second sets of input devices facing away from the user's torso, and in the second mode: the first and second sets of input devices are arranged to face away and upward from a substantially flat horizontal surface, making all keys and controls on all three portions usable and accessible from the t p the assembly responsive to the first portion being placed on the substantially flat, horizontal surface;

a processing unit coupled to the user interface device and configured to receive user input via the user interface device;

and a display device coupled to the user interface device and configured to display at least user input;

wherein each of the second and third portions further comprises:

a frame having at least four edges, two edges of the at least four edges being substantially parallel, the frame configured to secure the first or second set of input devices on the second or third portion; and a plurality of skirts, each skirt attached to the frame at one of the at least four edges and extending substantially perpendicular to a plane containing the first or second set of input devices on the second or third portion, wherein said skirts provide support to the second and third portion such that when in the second mode, an upper surface of the second and third portions rests at a level position above an upper surface of the first portion.

* * * * *